US008440251B2

(12) United States Patent
Villagran et al.

(10) Patent No.: US 8,440,251 B2
(45) **Date of Patent: *May 14, 2013**

(54) DOUGHS CONTAINING DEHYDRATED POTATO PRODUCTS

(75) Inventors: Maria Dolores Martinez-Serna Villagran, Mason, OH (US); Anthony John Boiano, Maineville, OH (US)

(73) Assignee: Kellogg North America Company, Battle Creek, MI (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/150,305

(22) Filed: Jun. 1, 2011

(65) Prior Publication Data

US 2011/0268859 A1 Nov. 3, 2011

Related U.S. Application Data

(63) Continuation of application No. 10/288,171, filed on Nov. 5, 2002, now Pat. No. 7,976,889.

(60) Provisional application No. 60/338,047, filed on Nov. 8, 2001.

(51) Int. Cl.
*A23K 1/00* (2006.01)

(52) U.S. Cl.
USPC ........... 426/637; 426/503; 426/517; 426/550; 426/553

(58) Field of Classification Search .................. 426/637, 426/808
See application file for complete search history.

(56) References Cited

U.S. PATENT DOCUMENTS

| | | | |
|---|---|---|---|
| 2,520,891 | A | 1/1948 | Rivoche |
| 2,490,431 | A | 12/1949 | Greene et al. |
| 2,759,832 | A | 8/1956 | Cording et al. |
| 2,780,552 | A | 2/1957 | Willard, Jr. et al. |
| 2,787,553 | A | 4/1957 | Cording, Jr. et al. |
| 3,009,817 | A | 11/1961 | Hendel et al. |
| 3,012,897 | A | 12/1961 | Sullivan et al. |
| 3,031,314 | A | 4/1962 | Hendel et al. |
| 3,067,042 | A | 12/1962 | Pader |
| 3,219,464 | A | 11/1965 | Cole |
| 3,314,805 | A | 4/1967 | Templeton |
| 3,355,304 | A | 11/1967 | Barnes et al. |
| 3,407,080 | A | 10/1968 | Rainwater et al. |
| 3,519,432 | A | 7/1970 | Succo et al. |
| 3,574,643 | A | 4/1971 | Lewis |
| 3,615,724 | A | 10/1971 | Sech |
| 3,622,355 | A | 11/1971 | Beck et al. |

(Continued)

FOREIGN PATENT DOCUMENTS

| | | |
|---|---|---|
| FR | 1258693 | 3/1961 |
| FR | 1288297 | 2/1962 |

(Continued)

OTHER PUBLICATIONS

Solutions Series; Food Preservation Fact Sheet: Cleargel™; Aug. 1993.

*Primary Examiner* — Patricia George
(74) *Attorney, Agent, or Firm* — Dickinson Wright PLLC

(57) ABSTRACT

Improved doughs containing dehydrated potato products, food products made from said doughs, and the methods for making the same are disclosed. Although the improved doughs contain non-ideal dehydrated potato products, processing efficiency and finished product quality are comparable to that of finished products made with doughs containing dehydrated potato products having from 40% to 60% broken cells and from 16% to 27% free amylose.

20 Claims, 9 Drawing Sheets

U.S. PATENT DOCUMENTS

| | | | |
|---|---|---|---|
| 3,626,466 | A | 12/1971 | Liepa |
| 3,634,105 | A | 1/1972 | Beck et al. |
| 3,800,050 | A | 3/1974 | Popel |
| 3,830,949 | A | 8/1974 | Shatila |
| 3,886,291 | A | 5/1975 | Willard |
| 3,911,114 | A | 10/1975 | Cardon |
| 3,917,866 | A | 11/1975 | Purves et al. |
| 3,968,260 | A | 7/1976 | Shatila et al. |
| 3,975,549 | A | 8/1976 | Shatila et al. |
| 3,987,210 | A | 10/1976 | Cremer |
| 3,988,484 | A | 10/1976 | Shatila |
| 3,997,684 | A | 12/1976 | Willard |
| 3,998,975 | A | 12/1976 | Liepa |
| 4,073,952 | A | 2/1978 | Standing et al. |
| 4,107,345 | A | 8/1978 | MacDonald et al. |
| 4,110,478 | A | 8/1978 | Ooraikul |
| 4,156,032 | A | 5/1979 | Kluge et al. |
| 4,241,094 | A | 12/1980 | O'Neil et al. |
| 4,419,375 | A | 12/1983 | Willard et al. |
| RE31,982 | E | 9/1985 | Beck et al. |
| RE31,983 | E | 9/1985 | Beck et al. |
| 4,770,893 | A | 9/1988 | Kluge et al. |
| 4,876,102 | A | 10/1989 | Feeney et al. |
| 4,946,704 | A | 8/1990 | De Wit |
| 5,110,613 | A | 5/1992 | Brown et al. |
| 5,292,542 | A | 3/1994 | Beck et al. |
| 5,320,858 | A | 6/1994 | Fazzolare et al. |
| 5,464,642 | A | 11/1995 | Villagran et al. |
| 5,464,643 | A | 11/1995 | Lodge |
| 5,500,240 | A | 3/1996 | Addesso |
| 5,554,405 | A | 9/1996 | Fazzolare et al. |
| 5,690,982 | A | 11/1997 | Fazzolare et al. |
| 5,695,804 | A | 12/1997 | Hnat et al. |
| 6,066,353 | A | 5/2000 | Villagran et al. |
| 6,177,116 | B1 | 1/2001 | Villagran et al. |
| 6,177,117 | B1 | 1/2001 | Irvin |
| 6,235,333 | B1 | 5/2001 | Villagran et al. |
| 6,287,622 | B1 | 9/2001 | Villagran et al. |
| 6,312,747 | B1 | 11/2001 | Villagran et al. |
| 6,461,663 | B1 | 10/2002 | Villagran et al. |
| 6,544,580 | B1 | 4/2003 | Villagran et al. |
| 6,703,065 | B2 | 3/2004 | Villagran et al. |
| 2002/0155207 | A1 | 10/2002 | Villagran |
| 2003/0026881 | A1 | 2/2003 | Villagran et al. |
| 2010/0047384 | A1 | 2/2010 | Rendle et al. |

FOREIGN PATENT DOCUMENTS

| | | | |
|---|---|---|---|
| GB | 985808 | | 3/1965 |
| GB | 1176897 | A | 4/1968 |
| GB | 1194421 | A1 | 6/1970 |
| GB | 1306384 | A1 | 2/1973 |
| JP | 07008174 | | 1/1995 |
| WO | WO 95/17099 | | 6/1995 |
| WO | WO 96/01572 | A1 | 1/1996 |
| WO | WO 99/33357 | A1 | 7/1999 |
| WO | WO 00/64280 | A2 | 11/2000 |

| | |
|---|---|
| a. Count as one broken cell if ruptured material can be traced back to a cell of origin. | 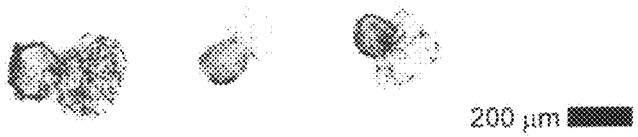 |
| b. If the cell has extruded material leaching out from two sides, count as one broken cell. | 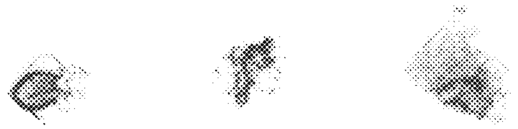 |
| c. If broken cells have ruptured material touching each other, trace a boundary around the extruded material and use the counting criteria to assign whole and broken cells. | 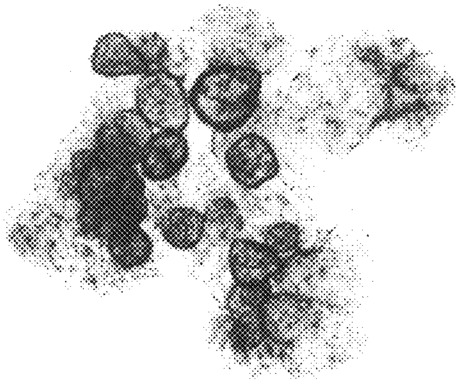 Before Tracing 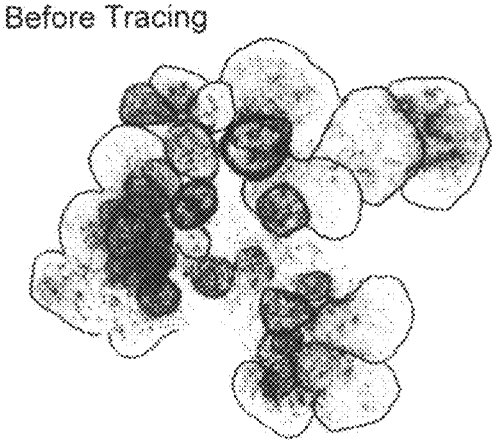 After Tracing |

Fig. 5

DOUGHS CONTAINING DEHYDRATED POTATO PRODUCTS

CROSS REFERENCE TO RELATED APPLICATION

This application is a continuation application of U.S. application Ser. No. 10/288,171, filed Nov. 5, 2002 now U.S. Pat. No. 7,976,889, which claims the benefit of priority to: U.S. Provisional Application Ser. No. 60/338,047, filed Nov. 8, 2001, all of which are herein incorporated by reference.

TECHNICAL FIELD

The present invention relates to methods of producing doughs containing non-ideal dehydrated potato products, doughs containing non-ideal dehydrated potato products and products made from said doughs.

BACKGROUND OF THE INVENTION

The preparation of food products from doughs based on dehydrated potato products is well known. Snacks such as fabricated chips are among the most popular products that have been prepared from such doughs. The advantages of preparing such food products from a dough includes homogeneity or uniformity in the finished food products and the ability to more closely control the separate steps involved in the preparation of said food products.

For snacks, especially snacks made from sheeted doughs, the quality of the dough determines the efficiency and reliability of the production process, and the quality of the finished product. It is known that doughs comprising potato flakes, having from 40% to 60% broken cells and from 16% to 27% free amylose, process well and result in god quality finished products. Unfortunately, such dehydrated potato products typically command a premium price and, in many geographies, are in limited supply. As a result, there have been attempts to produce doughs from non-ideal dehydrated potato products.

Non-ideal dehydrated potato products include those dehydrated potato products having less than 40% broken cells, a free amylose level of less than 16% or a combination thereof; dehydrated potato products having greater than 60% broken cells; and dehydrated potato products having less than 40% broken cells and a free amylose level of more than 27%. Although non-ideal dehydrated potato products are generally available and reasonably inexpensive, doughs that incorporate these products present numerous process and product quality challenges. For example, dough sheets comprising dehydrated potato products having less than 40% broken cells, a free amylose level of less than 16% or a combination thereof, can be weak and can break during processing and result in finished products that are dry and gummy, while doughs comprising dehydrated potato products having greater than 60% broken cells are difficult to mill and result in finished products that are soft and high in fat. Other doughs, such as those doughs that comprise dehydrated potato products having less than 40% broken cells and a free amylose level of more than 27% result in undesirably dense finished products. As non-ideal dehydrated potato products are inexpensive but produce sub par doughs and finished products, what is desired is a method of producing quality doughs and finished products from such potato products.

SUMMARY OF THE INVENTION

Applicants' invention relates to a method of producing a dough comprising the steps of:

a.) providing from about 55% to about 98%, by weight, of a dehydrated potato product having less than 40% broken cells, a free amylose level of less than 16% or a mixture thereof;

b.) providing from about 1% to about 15%, by weight, of a strengthening agent having a free amylose level of at least 5% and a water absorption index of from about 0 to about 3;

c.) providing from about 1% to about 10%, by weight, of a water absorption agent having a water absorption index of greater than about 8.5; and d.) combining said strengthening agent, water absorption agent, and dehydrated potato product with a solvent to form a dough.

Applicants also claim separate methods of producing improved doughs comprising dehydrated potato products selected from the group consisting of dehydrated potato products having greater than 60% broken cells; and dehydrated potato products having less than 40% broken cells, and a free amylose level of more than 27%. Applicants also claim said improved doughs and products made from said doughs. Unlike conventional methods of dough production, the advantages of Applicants' invention can be achieved without incorporating hydrolyzed starches, particularly hydrolyzed starches having a dextrose equivalent greater than 10, in said doughs.

DESCRIPTION OF THE DRAWINGS

FIG. 5 sets forth additional criteria for counting broken cells.

DETAILED DESCRIPTION

A. Definitions

Figure 1:
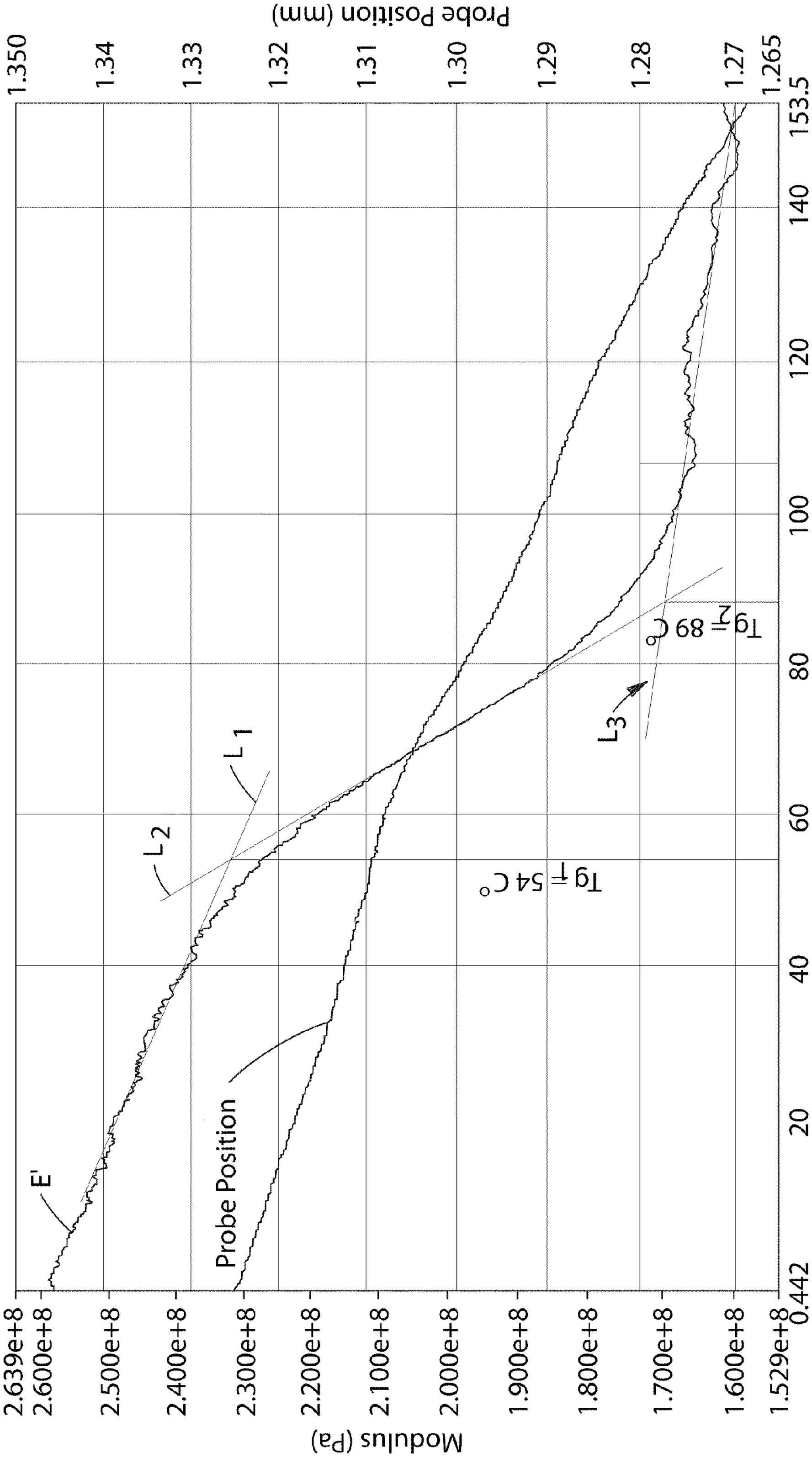
FIG. 1 illustrates how the glass transition temperatures $Tg_1$ and $Tg_2$ are determined graphically for a finished fabricated snack equilibrated at a constant relative humidity.

As used herein, "food product" includes, but is not limited to, fabricated snacks, French fries, and any other food comprising a dehydrated potato product.

As used herein, the term "dehydrated potato products" includes, but is not limited to, potato flakes, sheets and sheet sections of potato flakes, potato flanules, potato granules, potato agglomerates, any other fully or partially dehydrated potato material, and mixtures thereof.

As used herein "flanules" refers to dehydrated potato products described in U.S. patent application Ser. No. 09/175,138, Dough Compositions Made With Dehydrated Potato Flanules, filed Oct. 19, 1998 by Villagran et al. Flanules are dehydrated potato products having a WAI of from about 5.5 to about 7 and % free amylose level of from about 9 to about 19.

As used herein, the terms "anti-stiffening agent" does not include granules.

As used herein "sheetable dough" is a dough capable of being placed on a smooth surface and rolled to the desired final thickness without tearing or forming holes. The term "sheetable dough" also includes doughs that are capable of being formed into a sheet through an extrusion process.

As used herein, "rapid viscosity unit" (RVU) is an arbitrary unit of viscosity. (12 RVU equals approximately 1 centipoise)

The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™. These preferred non-digestible fats are described in Young et al., U.S. Pat. No. 5,085,884, issued Feb. 4, 1992, and U.S. Pat. No. 5,422,131, issued Jun. 6, 1995 to Elsen et al.

As used herein, the term "added solvent" refers to solvent which has been added to the dry dough ingredients. Solvent which is inherently present in the dry dough ingredients is not considered added solvent.

When used in a claim, the phrase "made from" is intended to be equivalent in scope to the word comprising. Also, it should be understood, by one of ordinary skill in the art, that in any claim claiming "a product made from a dough" such dough may have undergone further processing, such as frying or baking, in order to form the finished product. As a result, it is understood that the components of such dough may be transformed during such additional processing steps and that the phrase "a product made from a dough" encompasses doughs throughout any such transformation.

For purposes of this invention "% by weight" is defined as the weight of a component of Applicants' dough, other than added solvent, divided by the sum of the weights of all components of Applicants' dough, except any added solvent, such result being multiplied by one hundred.

All component or composition levels are in reference to the active level of that component or composition, and are exclusive of impurities, such as by-products, which may be present in commercially available sources.

All percentages and ratios are calculated by weight unless otherwise indicated.

As used herein the articles a and an when used in a claim, for example, "a wetting agent" or "an anti-stiffening agent" is understood to mean at least one of the components that are claimed or described.

Publications, patents, and patent applications are referred to throughout this disclosure. All references cited herein are hereby incorporated by reference in their entirety. The citation of any document is not to be construed as an admission that it is prior art with respect to the present invention.

B. Dough and Chip Preparation

The quality of any fabricated food is dependent on the properties of the dough from which the fabricated food is made. Although doughs have innumerable properties, Applicants recognized that a dough's ability to absorb water, and the elasticity and viscosity, are the critical properties that determine a dough's processability and finished product quality. Furthermore, Applicants recognized that the following analytical parameters are a measure of such critical properties: sheet tensile strength, modulus of elasticity, viscous modulus and glass transition temperature. However, most importantly, Applicants discovered a solution to the root causes of the process ability and finished product quality problems associated with doughs made from non-ideal dehydrated potato products. While not being bound by theory, Applicants believe that such process ability and finished product quality problems are related to the amount and type of free starch, free cell wall components and starch-lipid complexes found in such non-ideal dehydrated potato products. As Applicants recognized the source of such quality problems, Applicants were able to identify materials that, when combined with non-ideal flakes, eliminate the root causes of said quality problems. Certain embodiments of Applicants' invention comprising types and effective levels of such materials are detailed below.

1. Dough Components

Dehydrated Potato Products Having Less than 40% Broken Cells, a Free Amylose Level of Less than 16% or a Combination Thereof.

Embodiments of Applicants' invention comprise dehydrated potato products having less than 40% broken cells, a free amylose level of less than 16% or a combination thereof. Certain embodiments of Applicants' invention comprise from about 55% to about 98%, by weight, of said dehydrated potato products. Said dehydrated potato products may be obtained from Oregon Potato Co. of Boardman, Oreg. U.S.A. Embodiments of Applicants' invention comprising said type and amount of such dehydrated potato products contain a strengthening agent and a water absorption agent. Said strengthening agent typically has a free amylose level of at least 5%, preferably at least 10%, and most preferably at least 20%; and a water absorption index of from about 0 to about 3, preferably from about 0.5 to about 2.5, and most preferably from about 0.7 to about 2. Embodiments of Applicants' invention comprise from about 1% to about 15%, by weight, of said strengthening agent. Other embodiments of Applicants' invention comprise from about 1% to about 10%, by weight, of said strengthening agent. Still other embodiments of Applicants' invention comprise from about 2% to about 8%, by weight, of said strengthening agent. Useful strengthening agents include, but are not limited to, native tapioca starch, and potato starch supplied by Avebe America Inc. of Princeton, N.J. U.S.A.; Aytex®-P food powder wheat starch supplied by Archer Daniels Midland Co. of Olathe, Kans. U.S.A.; and Pencling® 205 and Penbind® 196 supplied by Penford Food Ingredients Company of Englewood, Colo. U.S.A.

Said water absorption agent typically has a water absorption index of greater than about 8.5, preferably greater than about 10 and most preferably greater than about 12. Such embodiments of Applicants' invention comprise from about 1% to about 10%, by weight, of said water absorption agent. Other embodiments of Applicants' invention comprise from about 2% to about 6%, by weight, of said water absorption agent. Still other embodiments of Applicants' invention comprise from about 3% to about 5%, by weight, of said water absorption agent. Useful water absorption agents include, but are not limited to, Instant Clearjel® supplied by National Starch & Chemical Company of Bridgewater, N.J. U.S.A. and Paselli™ EZ 1915 Avebe America Inc. of Princeton, N.J. U.S.A.

Dehydrated Potato Products Having Greater than 60% Broken Cells

Certain embodiments of Applicants' invention comprise from about 55% to about 98.9%, by weight, of a dehydrated potato product having greater than 60% broken cells. Said dehydrated potato products may be obtained from Winnemucca Farms of Winnemucca, Nev. U.S.A. Certain embodiments of Applicants' invention comprising said type and amount of such dehydrated potato products contain an anti-stiffening agent typically having a peak viscosity from about 40 cp to about 600 cp, and a final viscosity of from about 20 cp to about 400 cp. Other embodiments of Applicants' invention contain an anti-stiffening agent having a peak viscosity from about 40 cp to about 300 cp, and a final viscosity of from about 20 cp to about 200 cp. Such embodiments of Applicants' invention comprise from about 0.1% to about 10%, by weight, of an anti-stiffening agent. Other embodiments of Applicants' invention comprise from about 0.5% to about 7%, by weight, of an anti-stiffening agent. Still other embodiments of Applicants' invention comprise from about 1% to about 4%, by weight, of an anti-stiffening agent. Examples of useful anti-stiffening agents include, but are not limited to, Hylon® VII and Novelose® supplied by National Starch & Chemical Company of Bridgewater, N.J. U.S.A.; and Arabic Gum supplied by Importers Service Corporation (ISC) of Jersey City, N.J. U.S.A.

Other embodiments of Applicants' invention, comprising said type and amount of such dehydrated potato products and anti-stiffening agent, contain a water absorption agent typically having a water absorption index greater than 5, preferably greater than 8 and most preferably greater than 10. Such embodiments of Applicants' invention comprise from about 1% to about 20%, by weight, of said water absorption agent. Other embodiments of Applicants' invention comprise from about 2% to about 10%, by weight, of said water absorption agent. Still other embodiments of Applicants' invention comprise from about 3% to about 6%, by weight, of said water absorption agents. Useful water absorption agents include, but are not limited to, Instant Clearjel® supplied by National Starch & Chemical Company of Bridgewater, N.J. U.S.A. and Paselli™ EZ 1915 supplied by Avebe America Inc. of Princeton, N.J. U.S.A.

Dehydrated Potato Products Having Less than 40% Broken Cells and a Free Amylose Level of More than 27%

Certain embodiments of Applicants' invention comprise from about 55% to about 98% by weight, of a dehydrated potato product having less than 40% broken cells and a free amylose level of more than 27%. Said dehydrated potato products include dehydrated potato products made from Altura potatoes. Such dehydrated potato products may be obtained from Magic West, Inc. of Glenns Ferry, Id. U.S.A. Embodiments of Applicants' invention comprising said type and amount of such dehydrated potato products contain a water absorption agent. Said water absorption agent typically has a water absorption index of greater than about 8.5, preferably greater than about 10 and most preferably greater than about 12. Such embodiments of Applicants' invention comprise from about 1% to about 15%, by weight, of said water absorption agent. Other embodiments of Applicants' invention comprise from about 3% to about 10%, by weight, of said water absorption agent. Still other embodiments of Applicants' invention comprise from about 5% to about 8%, by weight, of said water absorption agent. Useful water absorption agents include, but are not limited to, Instant Clearjel® supplied by National Starch & Chemical Company of Bridgewater, N.J. U.S.A. and Paselli™ EZ 1915 supplied by Avebe America Inc. of Princeton, N.J. U.S.A.

Other embodiments of Applicants' invention, comprising said type and amount of such dehydrated potato products and water absorption agent, contain a wetting agent typically having a peak viscosity from about 300 cp to about 2000 cp and a final viscosity of from about 190 cp to about 1900 cp. Such embodiments of Applicants' invention comprise from about 1% to about 15%, by weight, of said wetting agent. Other embodiments of Applicants' invention comprise from about 2% to about 10%, by weight, of said wetting agent. Still other embodiments of Applicants' invention comprise from about 3% to about 5%, by weight, of said wetting agent. Useful wetting agents include, but are not limited to, Crispfilm® supplied by National Starch & Chemical Company of Bridgewater, N.J. U.S.A.; Paselli FPF™ potato fiber supplied by Avebe America Inc. of Princeton, N.J. U.S.A.

Solvent

Applicants' doughs comprise sufficient quantities of one or more edible added solvents to result in doughs that process well and produce quality finished products. Applicants' preferred added solvent is water. When one of ordinary skill in the art is in possession this specification's teachings, the amount of added solvent required to produce Applicants' doughs can easily be determined.

Adjunct Ingredients

Adjunct ingredients may be desirable. Examples of typical adjunct ingredients include, but are not limited to, emulsifiers and sugars. As known by those skilled in the art, the required adjunct ingredients that are needed to produce foods vary by food type. Selection of the appropriate type and level of adjunct ingredients is easily determined by one skilled in the art as said information is available in reference sources. For example, it is well known by those skilled in the art that extruded snacks utilize emulsifiers and may use leavening agents.

Although the type and level of adjunct ingredients that may be needed to produce any specific food product is known by those skilled in the art, Applicants have provided a number of examples wherein the type and level of adjunct ingredients used to produce a fabricated food is listed.

Additional Ingredients

Additional ingredients that can be added to the dough compositions include, but are not limited to, oils, vitamins, salt, flavorings, flavor potentiators, and/or seasonings. The additional ingredients can be included in the dough or sprinkled or sprayed on the surface of the snack after frying.

2. Dough and Chip Preparation

Although the present invention will be described primarily in terms of preferred doughs and fabricated chips, it should be readily apparent to one skilled in the art that the doughs of the present invention can be used in the production of any suitable food product. Examples of fabricated chips include those described in U.S. Pat. No. 3,998,975 issued Dec. 21, 1976 to Liepa, U.S. Pat. No. 5,464,642 issued Nov. 7, 1995 to Villagran et al., U.S. Pat. No. 5,464,643 issued Nov. 7, 1995 to Lodge, and PCT Application No. PCT/US95/07610 published Jan. 25, 1996 as WO 96/01572 by Dawes et al., all of which are herein incorporated by reference.

The production of preferred doughs and fabricated chips is set forth in detail below.

Dough Preparation and Characteristics

The doughs of the present invention can be prepared by any suitable method for forming sheetable doughs. Typically, a loose, dry dough is prepared by thoroughly mixing together the ingredients using conventional mixers. Preferably, a pre-blend of the liquid ingredients and a pre-blend of the dry ingredients are prepared; the wet pre-blend and the dry pre-blend are then mixed together to form the dough. Hobart® mixers are preferred for batch operations and Turbulizer® mixers are preferred for continuous mixing operations. Alternatively, extruders can be used to mix the dough and to form sheets or shaped pieces.

When analyzed according to Applicants' analytical methods, dough embodiments of Applicants' invention that comprise from about 55% to about 98%, by weight, of a dehydrated potato product having less than 40% broken cells, a free amylose level of less than 16% or a combination thereof are typically found to have a sheet tensile strength of from about 80 gf to about 1000 gf; a modulus of elasticity of from about 24 KPa to about 130 KPa; a viscous modulus of from about 5 KPa to about 40 KPa; and a dough glass transition temperature (Tg) from about −7° C. to about 10° C.

When analyzed according to Applicants' analytical methods, dough embodiments of Applicants' invention that comprise from about 55% to about 98.9%, by weight, of a dehydrated potato product having greater than 60% broken cells are typically found to have a sheet tensile strength of from about 60 gf to about 600 gf; a modulus of elasticity of from about 20 KPa to about 90 KPa; a viscous modulus of from about 10 KPa to about 25 KPa; and a glass transition temperature (Tg) from about −10° C. to about 10° C. for the dough.

When analyzed according to Applicants' analytical methods, dough embodiments of Applicants' invention that comprise from about 55% to about 98%, by weight, of dehydrated potato products having less than 40% broken cells and a free amylose level of more than 27% are typically found to have a sheet tensile strength of from about 100 gf to about 600 gf; a modulus of elasticity of from about 35 KPa to about 110 KPa; a viscous modulus of from about 5 KPa to about 25 KPa; and a dough glass transition temperature (Tg) from about −1° C. to about 8° C.

Dough Sheeting

Once prepared, the dough is then formed into a relatively flat, thin sheet. Any method suitable for forming such sheets from starch-based doughs can be used. For example, the sheet can be rolled out between two counter rotating cylindrical rollers to obtain a uniform, relatively thin sheet of dough material. Any conventional sheeting, milling and gauging equipment can be used. The mill rolls should preferably be heated to from about 90° F. (32° C.) to about 135° F. (57° C.). In a preferred embodiment, the mill rolls are kept at two different temperatures, with the front roller being cooler than the back roller. The dough can also be formed into a sheet by extrusion.

Doughs of the present invention are usually formed into a sheet having a thickness of from about 0.38 mm to about 2.50 mm, and preferably to a thickness of from about from about 0.46 mm to about 2.00 mm, and most preferably from 0.53 mm to 1.27 mm. For rippled (wavy shaped) fabricated chips, the preferred sheet thickness is about 1.14 mm.

The dough sheet is then formed into snack pieces. The snack pieces can be formed using any suitable stamping or cutting equipment. The snack pieces can be formed into a variety of shapes. For example, the snack pieces can be in the shape of ovals, squares, circles, a bowtie, a star wheel, or a pin wheel. The pieces can be scored to make rippled chips as described by Dawes et al. in PCT Application No. PCT/US95/07610, published Jan. 25, 1996 as WO 96/01572, which is herein incorporated by reference.

Frying

After the snack pieces are formed, they are cooked until crisp to form fabricated chips. The snack pieces can be fried in a fat composition comprising digestible fat, non-digestible fat, or mixtures thereof. For best results, clean frying oil should be used. In order to reduce the oil oxidation rate, the free fatty acid level of the oil should preferably be maintained at less than about 1%, more preferably less than about 0.3%.

In a preferred embodiment of the present invention, the frying oil has less than about 25% saturated fat, preferably less than about 20%. This type of oil improves the lubricity of the finished fabricated chips such that the finished fabricated chips have an enhanced flavor display. The flavor profile of these oils also enhance the flavor profile of topically seasoned products because of the oils' lower melting point. Examples of such oils include sunflower oil containing medium to high levels of oleic acid.

In another embodiment of the present invention, the snack pieces are fried in a blend of non-digestible fat and digestible fat. Preferably, the blend comprises from about 20% to about 90% non-digestible fat and from about 10% to about 80% digestible fat, more preferably from about 50% to about 90% non-digestible fat and from about 10% to about 50% digestible fat, and still more preferably from about 70% to about 85% non-digestible fat and from about 15% to about 30% digestible fat.

Other ingredients known in the art can also be added to the edible fats and oils, including antioxidants such as TBHQ, tocopherols, ascorbic acid, chelating agents such as citric acid, and anti-foaming agents such as dimethylpolysiloxane.

It is preferred to fry the snack pieces at temperatures of from about 275° F. (135° C.) to about 420° F. (215° C.), preferably from about 300° F. (149° C.) to about 410° F. (210° C.), and more preferably from about 350° F. (177° C.) to about 400° F. (204° C.) for a time sufficient to form a product having about 4% or less moisture, preferably from about 0.5% to about 4% moisture, and more preferably from about 1% to about 2% moisture. The exact frying time is controlled by the temperature of the frying fat and the starting water content of the dough, which can be easily determined by one skilled in the art.

Preferably, the snack pieces are fried in oil using a continuous frying method and are constrained during frying. This constrained frying method and apparatus is described in U.S. Pat. No. 3,626,466 issued Dec. 7, 1971 to Liepa, which is herein incorporated by reference. The shaped, constrained snack pieces are passed through the frying medium until they are fried to a crisp state and have a final moisture level of from about 0.5% to about 4%, preferably from about 1% to about 2%.

Any other method of frying, such as continuous frying or batch frying of the snack pieces in a non-constrained mode, is also acceptable. For example, the snack pieces can be immersed in the frying fat on a moving belt or basket.

The fabricated chips made from this process typically have from about 20% to about 45%, and preferably from about 25% to about 40%, total fat (i.e., combined non-digestible and digestible fat). If a higher fat level is desired to further improve the flavor or lubricity of the fabricated chips, an oil, such as a triglyceride oil, can be sprayed or applied by any other suitable means onto the fabricated chips when they emerge from the fryer, or when they are removed from the mold used in constrained frying. Preferably, the triglyceride oils applied have an iodine value greater than about 75, and most preferably above about 90. Such additional oil can be used to increase the total fat content of the fabricated chips to as high as 45% total fat. Thus, fabricated chips having various fat contents can be made using this additional step. In a preferred embodiment, at least 10%, preferably at least about 20%, of the total fat in the finished fabricated chips is topical surface fat.

Oils with a characteristic flavor or highly unsaturated oils can be sprayed, tumbled or otherwise applied onto the fabricated chips after frying. Preferably triglyceride oils and non-digestible fats are used as a carrier to disperse flavors and are added topically to the fabricated chips. These include, but are not limited to, butter flavored oils, natural or artificial flavored oils, herb oils, and oils with potato, garlic, or onion flavors added. This allows the introduction of a variety of flavors without having the flavor undergo browning reactions during the frying. This method can be used to introduce oils which would ordinarily undergo polymerization or oxidation during the heating necessary to fry the snacks.

Fabricated Food Characteristics and Stability

In addition to improving processing efficiency and finished product quality, the present invention also provides a fabricated chip with the benefit of increased textural stability. Textural stability relates to shelf stability, staleness, and aging.

While not being bound by theory, Applicants believe that when a fabricated food is stored at storage temperatures higher than the $Tg_1$ of said food, the food's oxidation rate increases significantly. Additionally, Applicants believe that, for any dough formulation, when formulation is kept constant and processing conditions are used to decrease finished product density, $Tg_1$ decreases. Therefore, by formulating fabricated foods, like fabricated chips, such that the $Tg_1$ of such foods is raised while density is maintained or lowered, the textural stability of such foods can be improved. To summarize, Applicants' invention provides fabricated foods, particularly fabricated chips, having a high $Tg_1$ and a low to medium density.

In addition to discovering that textural stability is a function of $Tg_1$ and density, Applicants have found that the combination of $Tg_2$ and density is also correlated to textural stability. Furthermore, $Tg_2$ is believed to be the point at which a product's transition from the glassy phase to the rubbery plateau is complete, while $Tg_1$ is believe to represent the onset of a product's transition from the glassy phase to the rubbery plateau. As $Tg_1$ represents the onset of the transition from the glassy phase to the rubbery plateau, it is as useful as $Tg_2$ when used to characterize the textural stability of fabricated foods. The $Tg_1$, $Tg_2$ and density ranges of Applicants' fabricated chip embodiments (equilibrated at an Aw of about 0.30 @ 20° C.) are more fully detailed below.

Embodiments of Applicants' fabricated chips have a $Tg_1$ greater than about 40° C. Other embodiments of Applicants' fabricated chips have a $Tg_1$ from about 45° C. to about 75° C. Still other embodiments of Applicants' fabricated chips have a $Tg_1$ from about 50° C. to about 75° C.

Certain embodiments of Applicants' fabricated chips have a $Tg_2$ greater than about 70° C. Other embodiments of Applicants' fabricated chips have a $Tg_2$ from about 80° C. to about 120° C. Still other embodiments of Applicants' fabricated chips have a $Tg_2$ from about 80° C. to about 105° C.

Certain embodiments of Applicants' fabricated chips have a $Tg_1$ greater than about 40° C. and a $Tg_2$ greater than about 70° C. Other embodiments of Applicants' fabricated chips have a $Tg_1$ from about 45° C. to about 75° C. and a $Tg_2$ from about 80° C. to about 120° C. Still other embodiments of Applicants' fabricated chips have a $Tg_1$ from about 50° C. to about 75° C. and a $Tg_2$ from about 80° C. to about 105° C.

Embodiments of the Applicants' fabricated chips, having the $Tg_1$, $Tg_2$ and combination of $Tg_1$ and $Tg_2$ characteristics detailed above, have a densities from about 0.55 g/ml to about 1.1 g/ml. Other embodiments of such fabricated chips have a densities from about 0.65 g/ml to about 0.95 g/ml. Still other embodiments of such fabricated chips have a densities from about 0.75 g/ml to about 0.85 g/ml.

Analytical Methods

The parameters used to characterize elements of the present invention are quantified by the particular analytical methods that are described in detail below. Unless indicated otherwise, all laboratory instruments should be operated according to manufacturers' instructions.

1. Percent Free Amylose (A %) Test

This method is designed to measure the percentage (relative quantity) of free amylose in dehydrated potato products and other starch-based materials which is soluble in 0.1N NaOH solution under specific test conditions. The starch-based material of interest is stirred in a base solution at 60° C. for 30 minutes, centrifuged, and the clear supernatant is then reacted with iodine and analyzed spectrophotometrically. The free amylose is measured as the iodine complexes at 700 nm, rather than 610 nm, to avoid the interference from the "amylopectin-$I_2$ complex."

Apparatus

Volumetric flasks, volumetric pipettes, balance, spectrophotometer (Beckman Model 24 or equivalent), cells (1 cm disposable, Marksman Science #1-P-10, or 1 cm sipper type Markson MB-178 or Beckman Part #579215), constant temperature bath, blender and blender jars.

Reagents 0.1N Sodium Hydroxide Solution, Hydrochloric Acid, Iodine, Potassium Iodide, Calibration Standard (Amylose—Sigma Type III potato cat. # A-0512).

Preparation of Solutions

A. Stock Iodine Solution

Weigh 2 g of Iodine and 20 g of Potassium Iodide into a red 250 ml volumetric flask, and dissolve with distilled water.

B. Reagent Iodine Solution

Pipet 10 ml of the stock Iodine solution and 2 ml of concentrated hydrochloric acid into a red 1000 ml volumetric flask. Dilute to volume with distilled water.

Standard Curve Preparation

1. Dissolve 1 g of amylose (Sigma Type III potato cat. # A-0512) with 100 ml 0.1N NaOH. Transfer the entire solution into a centrifuge bottle, without rinsing. Centrifuge at 1600 rpm for 15 min.
2. Prepare three dilutions: a) 10 ml of supernatant into 100 ml of 0.1N NaOH, b) 5 ml of supernatant of the first dilution into 100 ml of 0.1N NaOH, and c) 50 ml of the second dilution into 100 ml of 0.1N NaOH.

Sample Preparation

1. Obtain percent moisture in each sample. (Vacuum oven 16 hours 70° C., or 3 hr @ 130° C. in an air oven).
2. Weigh 0.2 g of starch-based material and dissolve with 100 ml of 0.1N NaOH solution. Turn the stirrer on high to obtain a good vortex in the liquid.
3. Place samples in the 60° C. water bath. Stir for 30 minutes. Remove from bath.
4. Pour the entire solution into a centrifuge bottle; do not rinse. Centrifuge at 1600 rpm for 15 minutes.
5. Pipet 1 ml of the supernatant into a 25 ml volumetric flask. Dilute to volume with iodine reagent. Prepare the blank solution, using 1 ml of the 0.1N NaOH solution in a 25 ml flask. Shake well. The colorimetric determination must be made 10-30 minutes after mixing.

Colorimetric Determination

Set the wavelength to 700 nm. Zero the instrument with distilled water in the sample cell and in the reference beam. Fill the sample cell with blank solution and read against distilled water. Note this value and subtract from each sample value. In normal practice, the absorbances falls between 0.02 and 0.8 absorbance units.

Calculations (Using the Standard Amylose):

Plot a curve using g Amylose/100 ml of standard concentrations as the x axis versus the absorbance @ 700 nm as the y axis.

$$\%\ \text{Free Amylose}=[(\text{Amylose g/100 ml})\times 100]/[[100-\%\ \text{water})\times(\text{Sample wt.})]/100]$$

2. Oscillatory Test Method

Rheological Properties (G' & G")

Oscillatory testing involves applying a small, non-destructive sinudoidal stress on the sample and measuring the strain output. A Control Stress Rheomether CSL[2] 100 supplied by TA Instruments Inc., New Castle, Del. is used to measure modulus of elasticity (G') and viscous modulus (G"). The dynamic testing is done with a 4 cm cross-hatch parallel plate at 32.0° C. Samples must be analyzed within 5 minutes of collection to ensure that the samples are analyzed while fresh.

Test Procedure

1. A 4 cm diameter dough sample, having a thickness of from about 0.38 mm to about 2.50 mm, is cut from a dough sheet and placed on the bottom plate. The gap is set by lowering the top plate to 80% of the original thickness of the dough sample. The exposed edge of the sample is coated with a thin layer of mineral oil to minimize moisture loss during the test.
2. To relax any stresses introduced during the sample mounting, all samples are equilibrated for 2 min. before the measurement.
3. A stress sweep is performed at low and high frequencies in order to find the linear viscoelastic region for each dough type.
4. To determine the dough's structure changes with increasing frequency of oscillation, a frequency sweep is performed at a constant stress within the linear viscoelastic region of the dough. This gives a representative view of how the elastic and viscous components behave in the dough.
5. After Steps 1 through 4 are completed, the elastic modulus (G'), and loss modulus (G") are recorded at 1 rad/sec. Steps 1 and 5 are repeated for at least two dough samples within a dough type. The average of (G') and (G") for three dough samples (initial sample plus two repeats) are considered the (G') and (G") for the dough type that was tested.

3. Glass Transition Temperature Measurements for Dough and Fabricated Chip

Glass Transition Temperatures Tg, $Tg_1$ and $Tg_2$ measurements are performed using a Perkin Elmer Dynamic Mechanical Analyzer DMA-7e. Five samples are run for any dough or finished product. The average of 5 sample $Tg_1$ values is considered to be the respective $Tg_1$ of a finished product, while the average of 5 sample $Tg_2$ values is considered to be the $Tg_2$ of a finished product. The average of 5 sample Tg values is considered to be the respective Tg value for a tested dough.

Dough (Tg)

Figure 2:
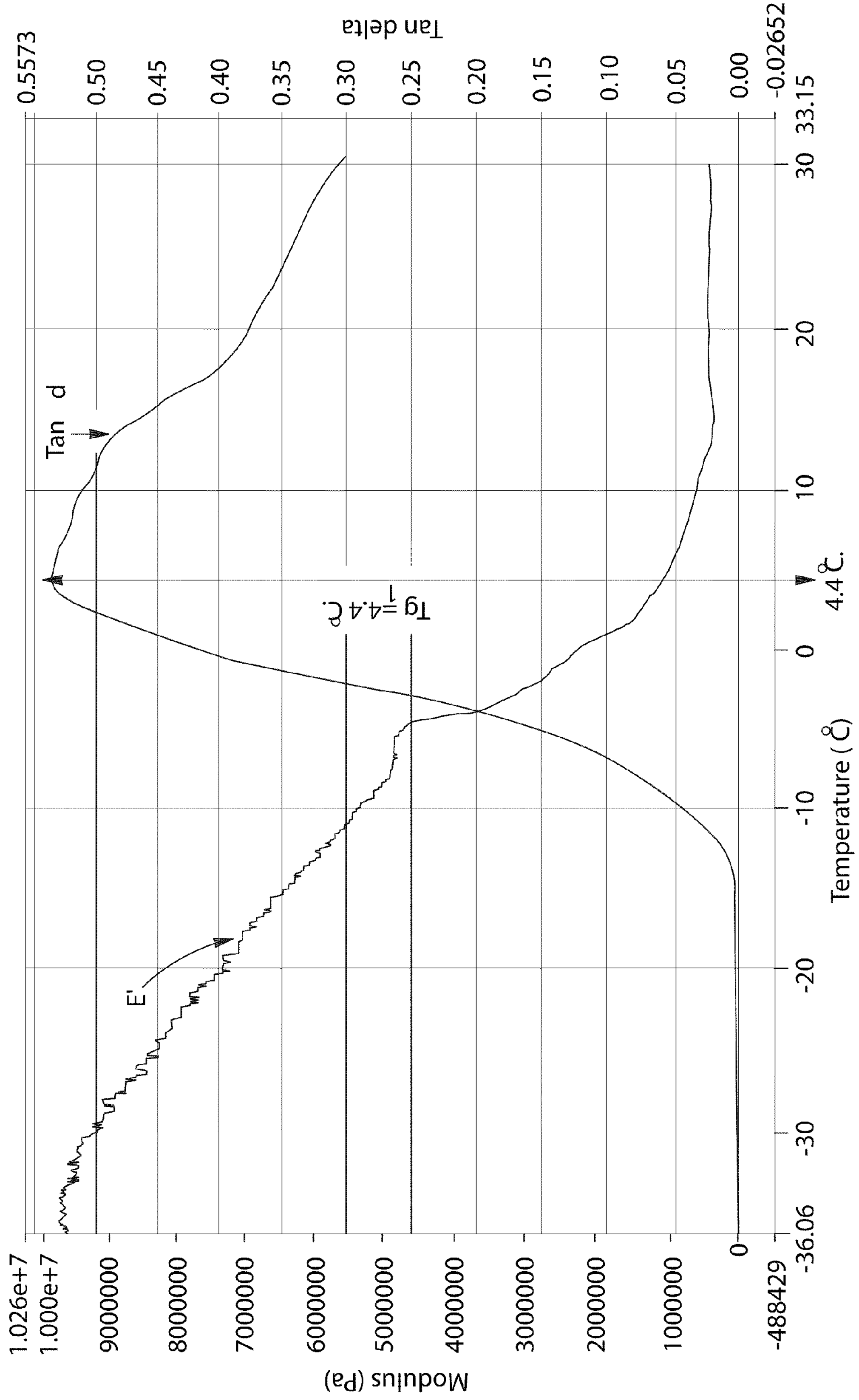
FIG. 2 illustrates how the glass transition temperature Tg of a dough is determined graphically.

For dough samples, a parallel plate configuration having a 5 mm diameter top plate (Perkin Elmer Part No. N539-0143) and a 15 mm diameter bottom plate (Perkin Elmer Part No. N539-0145) and an initial temperature of at least −30° C. is used. A dough sample having a thickness of from about 0.38 mm to about 2.50 mm is obtained and frozen, in liquid nitrogen, within 1 minute of being made. Samples having a diameter of 5 mm are sliced or punched, from the frozen dough. A sliced/punched dough sample is placed between the parallel plates in such a manner as to be capable of being completely covered by said top parallel plate during testing. Then, a 100 mN static force and a 85 mN dynamic force, at 1 Hz frequency, are applied to the sample. The test temperature is ramped from −30° C. to 30° C. at 5° C./min. As shown in FIG. 2, the storage modulus (E') and Tan δ (tan delta) are plotted against temperature. For a test to be valid, any value for E', except the initial value of E', in the plot of E' versus temperature, cannot be greater than 4% of any preceding value for E'. The glass transition temperature (Tg) is considered to be the temperature value that corresponds to the peak value in Tan 6 (tan delta) during or after the first drop in (E') vs temperature plot.

Fabricated Chip ($Tg_1$) and ($Tg_2$)

For finished fabricated chip samples, a 3-point bending configuration, having a 10 mm bending platform (Perkin Elmer Part No. N539-0197) and a 5 mm knife edge probe tip (Perkin Elmer Part No. N539-1063), is used. A center portion of a test chip, having an $A_W$ of 0.3±0.05, is cut out to form a chip portion that is from 15 mm to 18 mm long and from 5 mm to 10 mm wide. Said chip portion is then placed in the 3-point bending configuration such that the chip portion bridges the 10 mm bending platform of the 3-point bending configuration without touching the walls of the sample tube, and does not rock when the probe initially contacts said chip portion. Then, a 100 mN static force and a 85 mN dynamic force, at 1 Hz frequency, are applied to the chip portion. The test temperature is ramped from 0° C. to 160° C. at 5° C./min. As shown in FIG. 1, the storage modulus (E') is plotted against temperature, and probe position is plotted against temperature. For a test to be valid, any value for probe position, except the initial value of probe position, in the plot of probe position versus temperature, cannot be greater than 101% of any preceding value for probe position. Also, the probe must not break the sample during the test.

Procedure for Determining ($Tg_1$) and ($Tg_2$) for a Test Sample

1. Draw the best fit line through the points on the plot of E' vs temperature that correspond to the temperature range of 20° C. to 40° C. and designate this line as $L_1$.
2. Draw a best fit line through the points on the plot of E' vs temperature that correspond to the transition region between the glassy phase and the rubbery plateau. Designate this line as $L_2$.
3. Draw the best fit line through the points on the plot of E' vs temperature that correspond to the temperature range of 105° C. to 120° C. and designate this line as $L_3$.
4. For a test sample, $Tg_1$ is considered to be the temperature that corresponds to the intersection point of $L_1$ and $L_2$ and $Tg_2$ is considered to be the temperature that corresponds to the intersection point of $L_2$ and $L_3$.

4. Water Activity (Aw)

The water activity is defined as the ratio $A_w=p/p_o$, where p represents the actual partial pressure of water vapor and $P_o$ the maximum possible water vapor pressure of pure water (saturation pressure) at the same temperature. The $A_w$ level is therefore dimensionless; pure water has a level of 1.0, and a completely water-free substance has a level of 0.0. The relationship between the equilibrium relative humidity % RH in a food and the water activity is $A_w\times 100=\%$ RH.

Instrument

Rotronic Hygromer® AwVc with an operational temperature range from 0° C. to 100° C., and 0% to 100% RH.

Method

1. Weigh approximately 5 grams of sample and transfer it into a plastic bag.
2. Break the sample into small pieces with a flat object.

3. Place the sample in a small plastic Rotronic dish and then place the dish in the bottom half of the measuring station.
4. Begin the test cycle—an $A_w$ reading is taken when the test cycle is complete. The resulting $A_w$ value is considered to be the $A_w$ value for the chip.
5. Water Absorption Index (WAI)

Dry Ingredients:

In general, the terms "Water Absorption Index" and "WAI" refer to the water-holding capacity of a carbohydrate based material. (See e.g. R. A. Anderson et al., *Gelatinization of Corn Grits By Roll- and Extrusion-Cooking,* 14(1):4 CEREAL SCIENCE TODAY (1969).)

The WAI for a sample is determined as follows:
1. Weigh an empty centrifuge tube to two decimal places.
2. Place two grams of dry sample into the tube.
3. Add thirty milliliters of water, having a temperature of 30° C., to the tube.
4. Stir the combined water and sample vigorously so that no dry lumps remain.
5. Place the tube in a water bath, having a temperature of 30° C., for 30 minutes. Stir the combined water and sample vigorously at the 10 minute, 20 minute and 30 minute marks.
6. Centrifuge the combined water and sample in a Centra® MP4 centrifuge, supplied by International equipment Company of Needham Heights, Mass. U.S.A., for 15 minutes at 3,000 rpm.
7. Decant the water from the tube, leaving a gel behind.
8. Weigh the tube and its contents.
9. The WAI is calculated by dividing the weight of the resulting gel by the weight of the dry sample:

$$WAI=([\text{weight of tube and gel}]-[\text{weight of tube}])\div[\text{weight of dry sample}])$$

6. Percent Broken Cells

The percentage of broken cells of any dehydrated potato product is determined as follows.

Sample Preparation

A 0.5% Trypan Blue stock solution is prepared by dissolving 0.5 g Trypan Blue (Aldrich, Milwaukee, Wis., USA) into 99.5 g of distilled deionized 25° C. water. A 0.08% working solution of Trypan Blue is prepared by diluting 4 ml of stock solution into 21 ml distilled deionized water. Representative sub-sampling of the dehydrated potato product samples is critical to obtaining accurate and reproducible results. A dehydrated potato product sample is collected and about 0.05 g of such sample is placed in an 8 ml vial. To this, 10 drops of stain is added and allowed to stand for 6 minutes. The mixture is diluted with 2.5 ml of distilled deionized 25° C. water and stirred constantly with a glass stifling rod for 1 minute. One drop of sample mixture is placed on the center of a microscope slide and one drop of distilled deionized water is added. The sample mixture is gently stirred using the end of a disposable pipet until the color is even across the drop and the sample is evenly dispersed. A coverslip is then placed over the sample on the slide and the slide is examined under the microscope directly after being prepared. The examination of the slide must be completed within 20 minutes of being prepared.

Light Microscopy Examination

Light Microscopy is performed using a Nikon Eclipse E1000 microscope under brightfield illumination with a 4× objective. At this magnification, the depth of focus is such that all of the potato cells across an image are in focus. Images are collected using a Spot Camera (Diagnostic Instruments model 140 and model SP401-115) and printed to aid in counting. Variation in the photomicrographs shown are due to variations in the camera collection setting for RGB signal, and are not due to staining differences in the samples. For each sample, three freshly-made slides are observed under the light microscope and five images, randomly selected across the slide, are collected. This protocol permits at least 300 cells to be counted. More slides can be prepared or the amount of sample dosed on each slide can be adjusted if the count is less than 300.

Grading Criteria to Assign Whole Versus Broken Potato Cells

Figure 3:
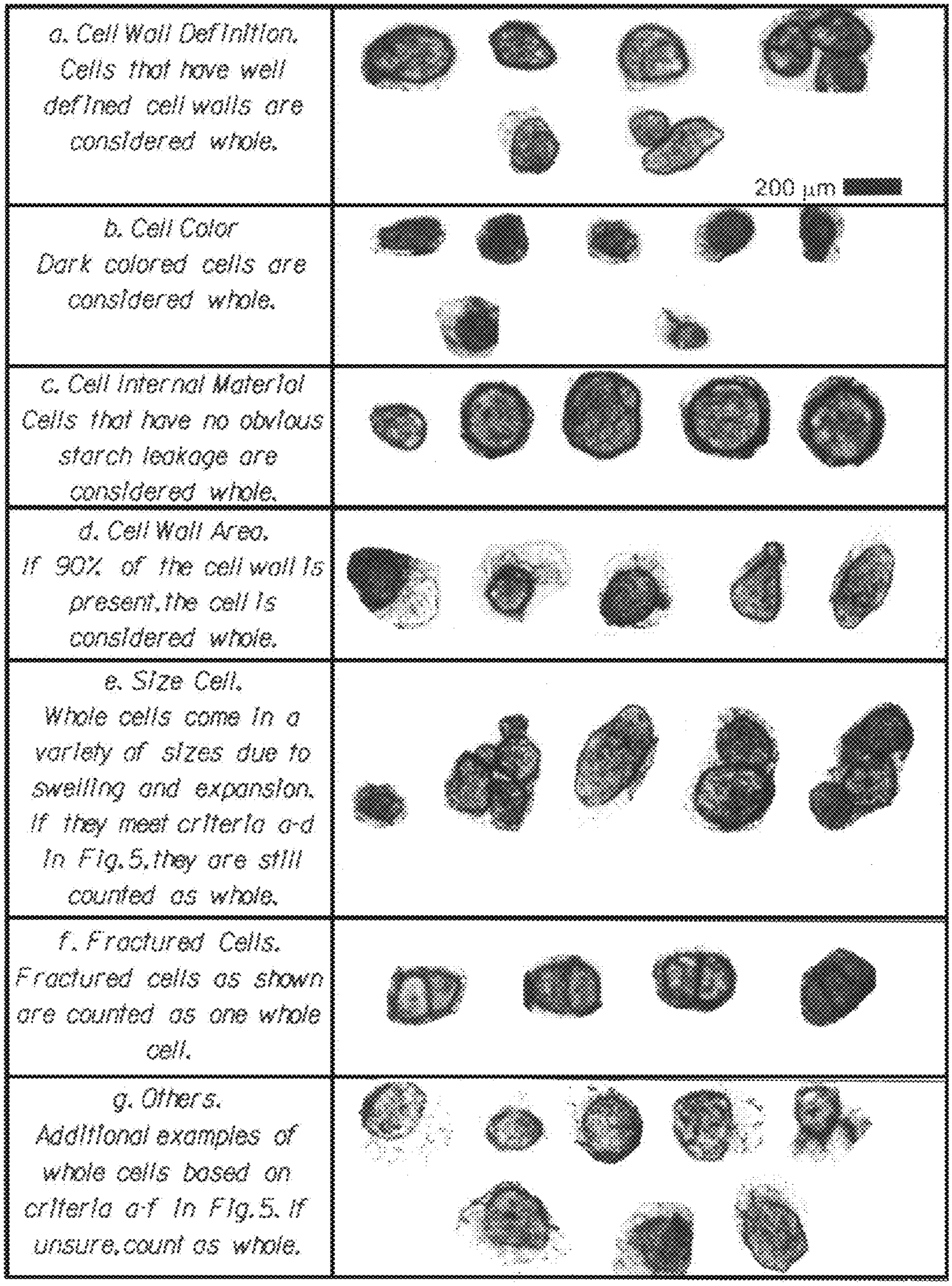
FIG. 3 sets forth criteria for determining whole cells.
Figure 4:
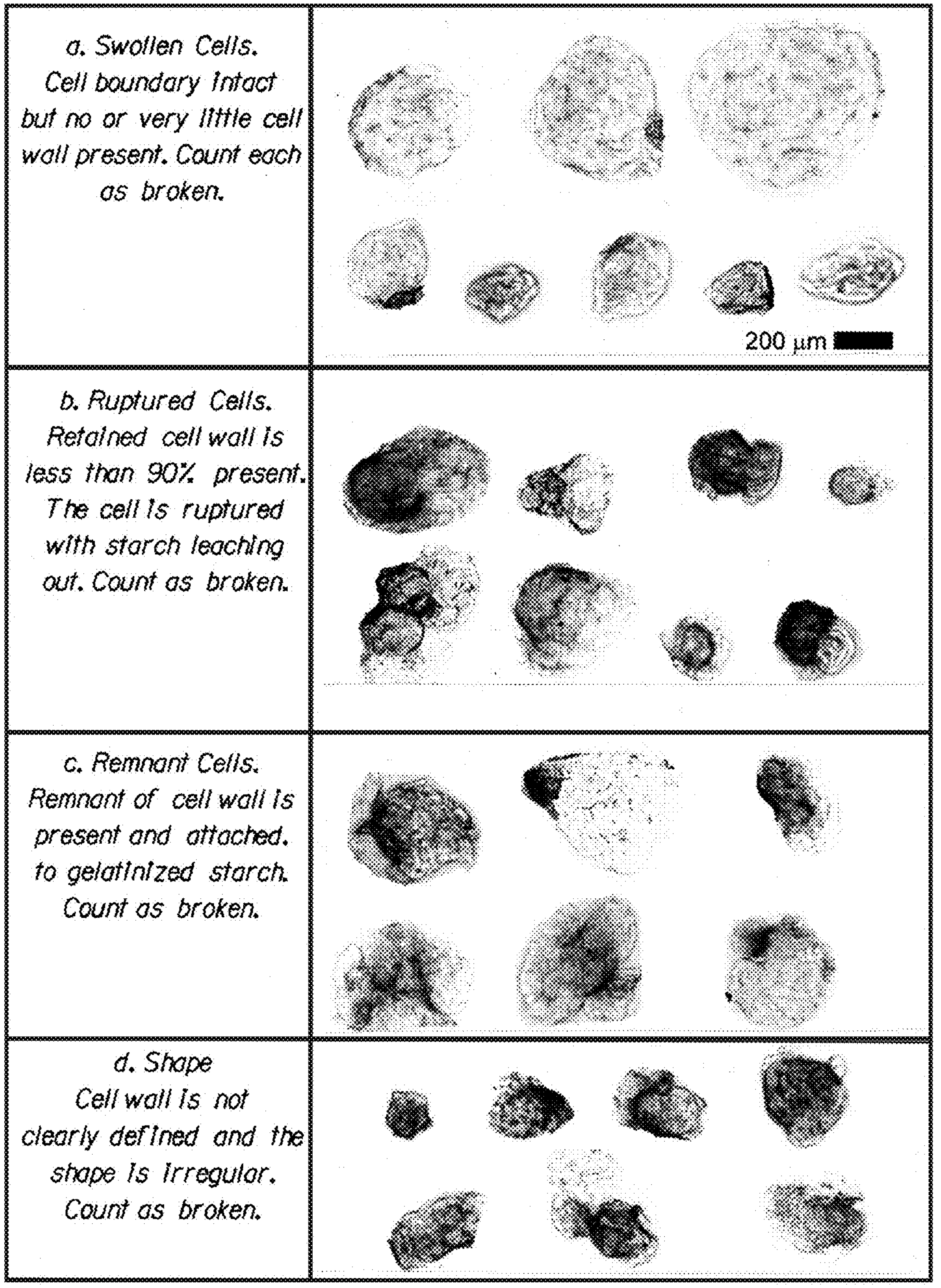
FIG. 4 sets forth criteria for determining broken cells.
Figure 6:
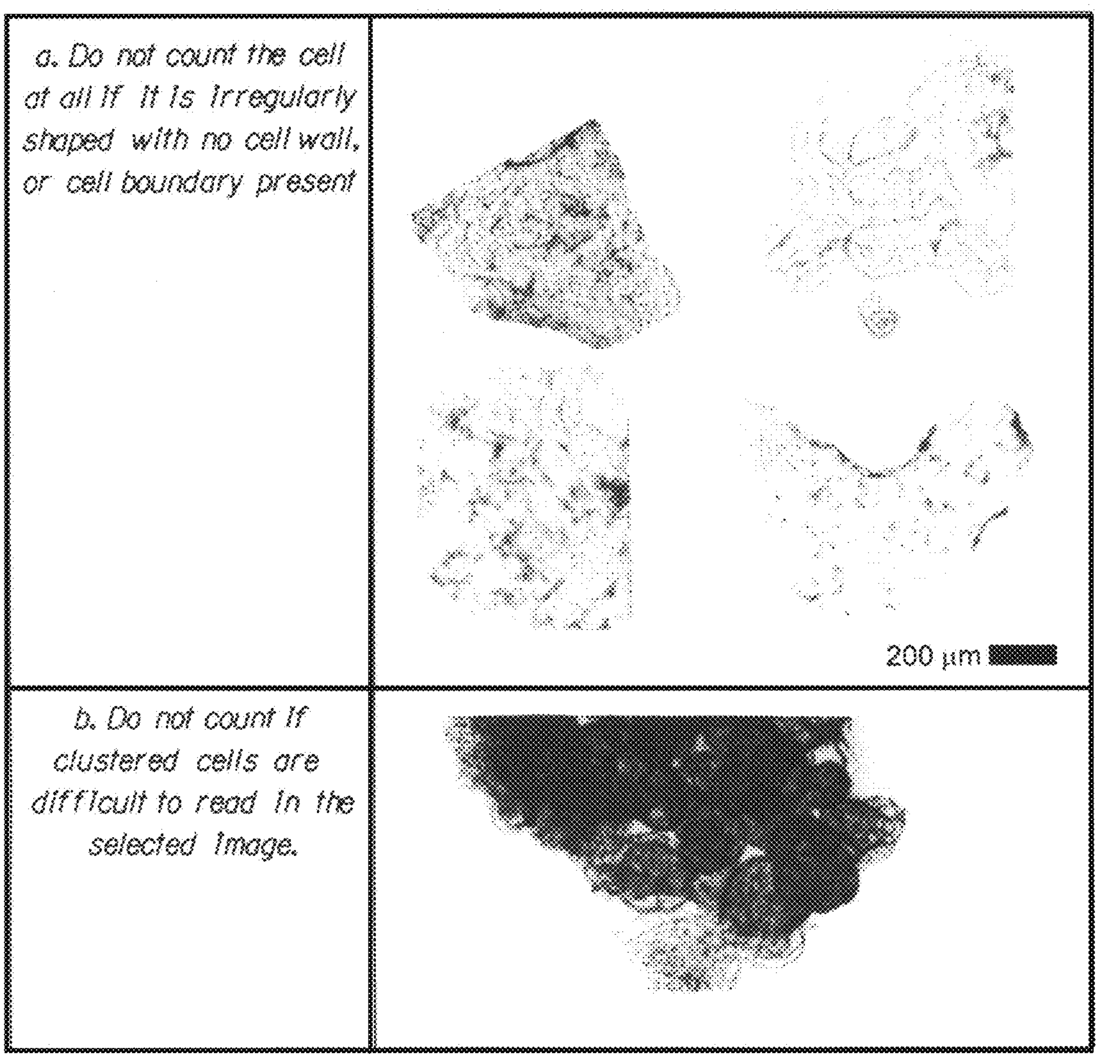
FIG. 6 sets forth other criteria for cell counting.

The criteria presented in FIGS. 3-6 are used to determine whole and broken cells in the acquired images. FIG. 3 (*a*-*g*) provides examples and attributes of potato cells which are counted as whole. FIG. 4 (*a*-*d*) provides images of typically observed broken cells. FIG. 5 (*a*-*c*) provides additional criteria used to count broken cells due to complexity of counting broken cells. FIG. 6 (*a*-*b*) provides additional examples of cells that should not be included in counting.

Cell Counting Procedure

The number of broken and whole cells are counted directly from the microscope image or from a printed image using the established criteria. Cells to be counted must lie completely within the image. Total number of potato cells counted per sample is at least 300. If the count is less than 300, more images are collected. The percent broken cells is calculated from the total number of whole and broken cells counted throughout the images using the following equation:

$$\%\text{ Broken Cells} = \frac{\#\text{ Broken cells}}{\#\text{ Broken cells} + \#\text{ Whole cells}} \times 100$$

One result of % broken cells is reported per sample.

Grading Criteria

In most food applications, such as mashed potatoes and fabricated potato chips, dehydrated potato products are used in limited water conditions and undergo limited mechanical and thermal energy input. Therefore, the free or soluble starch (amylose) that gets incorporated into the food product is largely the starch which has extruded from the cells during the making of the dehydrated potato product. Therefore, the morphological criteria defining broken versus whole potato cells are designed to quantitate the amount of cell damage due to the dehydration process.

To aid the assignment of whole versus broken cells, images of the various features observed were collected. FIGS. 3 through 6 present and describe these features and assign the cells within these features as whole or broken.

Whole cells are most often identified as a blue dyed cell having a continuous cell wall. If the cell wall is intact by at least 90%, as shown in FIG. 3*d*, enough of the starch material is still inside the cell such that the cell behaves essentially as an intact cell. Therefore, a cell is counted as whole if at least 90% of the cell wall is observed intact. Swollen cells are considered whole, as long as the cell wall is intact by at least 90%, as illustrated in FIG. 3*e*. Additionally, cells which may appear fractured are considered whole if the cell wall is intact, as shown in FIG. 3*f*.

A cell is considered broken if less than 90% of the cell wall is present but with at least a cell membrane surrounding the cell (shown in FIGS. 6*a*-*d*). The cell is not counted if no cell wall or cell boundary is attached to the free starch material (as shown in FIG. 6*a*) since it is extremely difficult to match all the free material with the cell of origin.

Additionally, to aid in counting, the potato cell is considered whole (as shown in FIG. 3*g*) as long as the criteria for assigning whole cells is met. However, in the case of bundles containing tightly bound cells in which it is difficult or impossible to see the cell boundaries, cells are not counted and a different sample must be prepared (as shown in FIG. 6*b*).

Application of the Method

Figure 7:
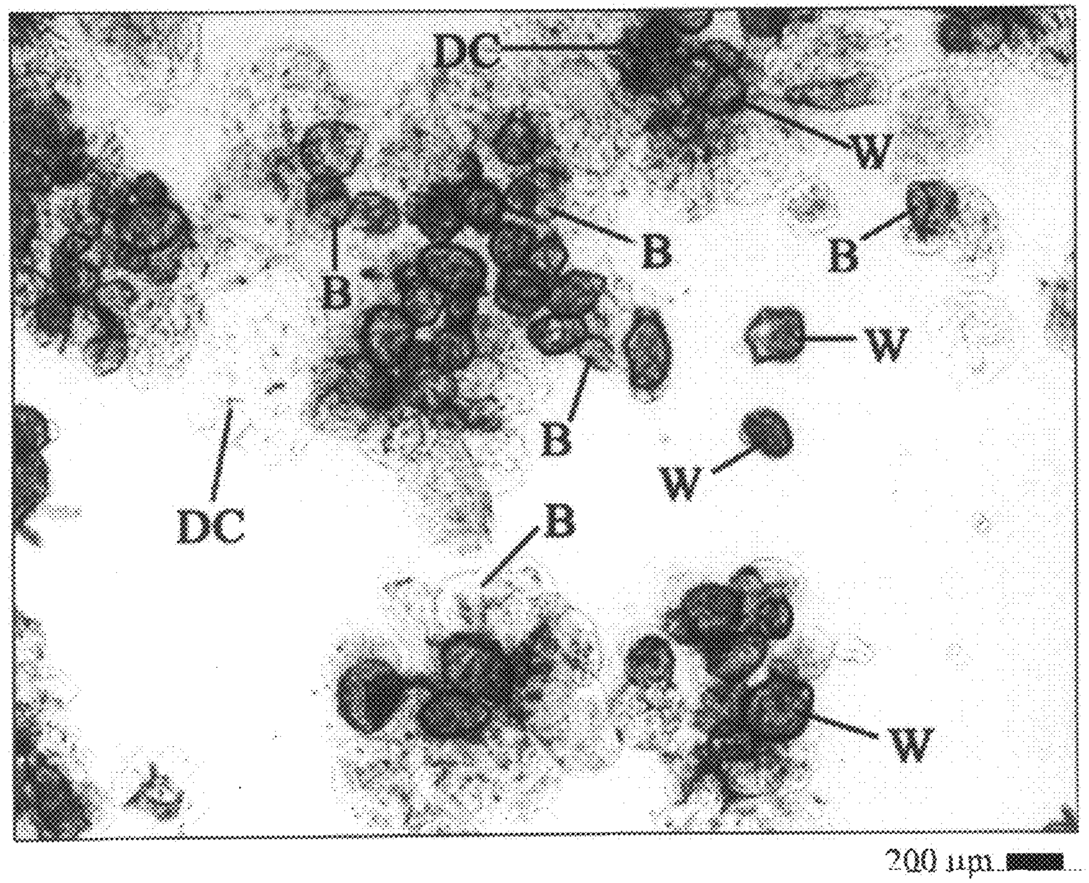
FIG. 7 is an image of 100% Norchip potato flakes for demonstration of the whole and broken cell counting procedure.

FIG. 7 shows an image of 100% Norchip potato flakes. For a demonstration of the counting procedure, several of the cells have been labeled according to their condition, including "W" for whole, "B" for broken, and "DC" for do not count.

7. Sheet Tensile Strength Test

The tensile test is a mechanical stress-strain test measuring the tensile strength of the dough sheet. A dough strip is mounted by its ends onto the testing machine. The dough strip is elongated at a constant rate until the strip breaks. The force (g) at which the strip breaks is the tensile strength of the dough. The output of the tensile test is recorded as force/load versus distance/time.

Equipment

Figure 8:
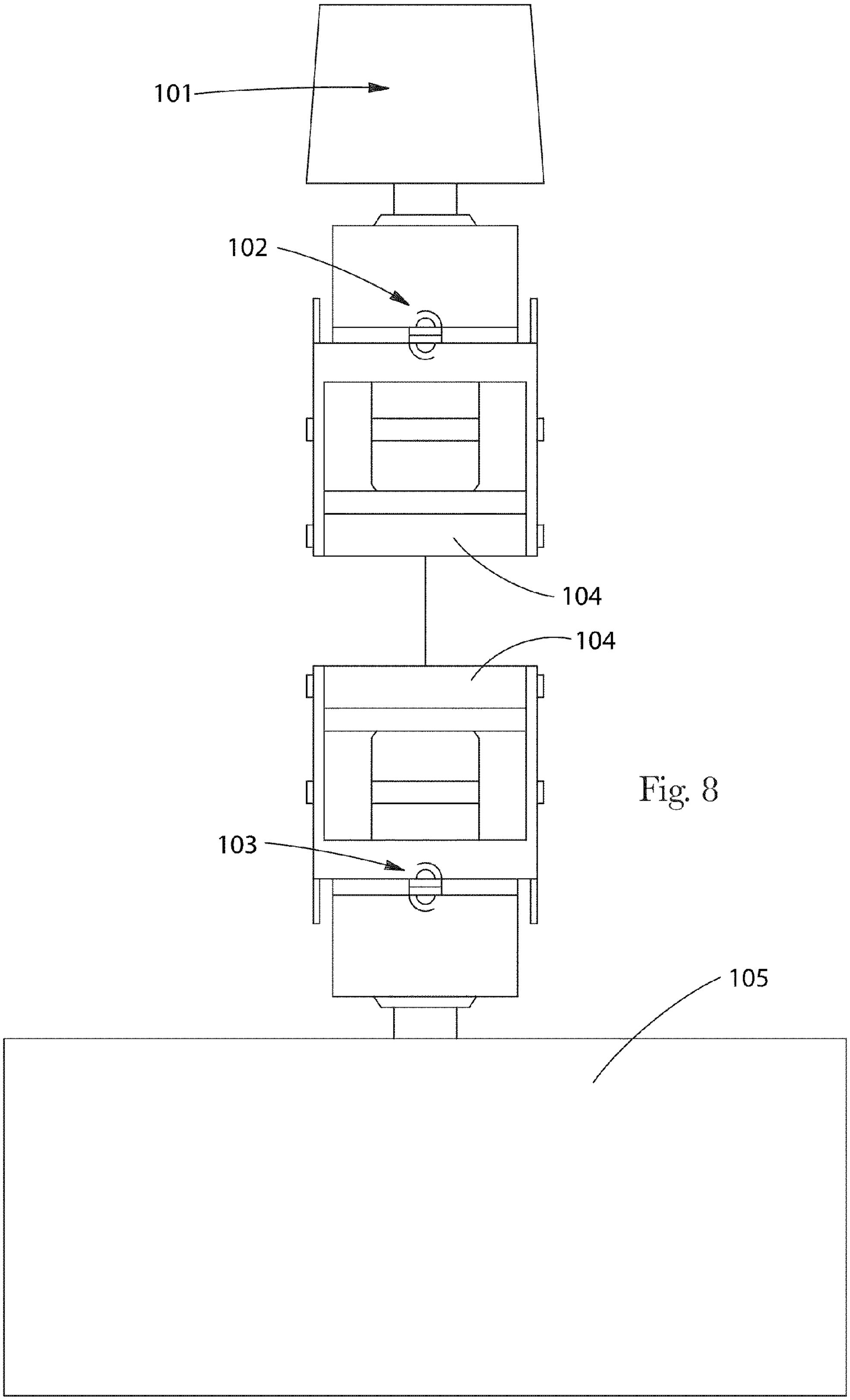
FIG. 8 is a front view of a Texture Analyzer having modified Instron Elastomeric Grips affixed thereto.
Figure 9:
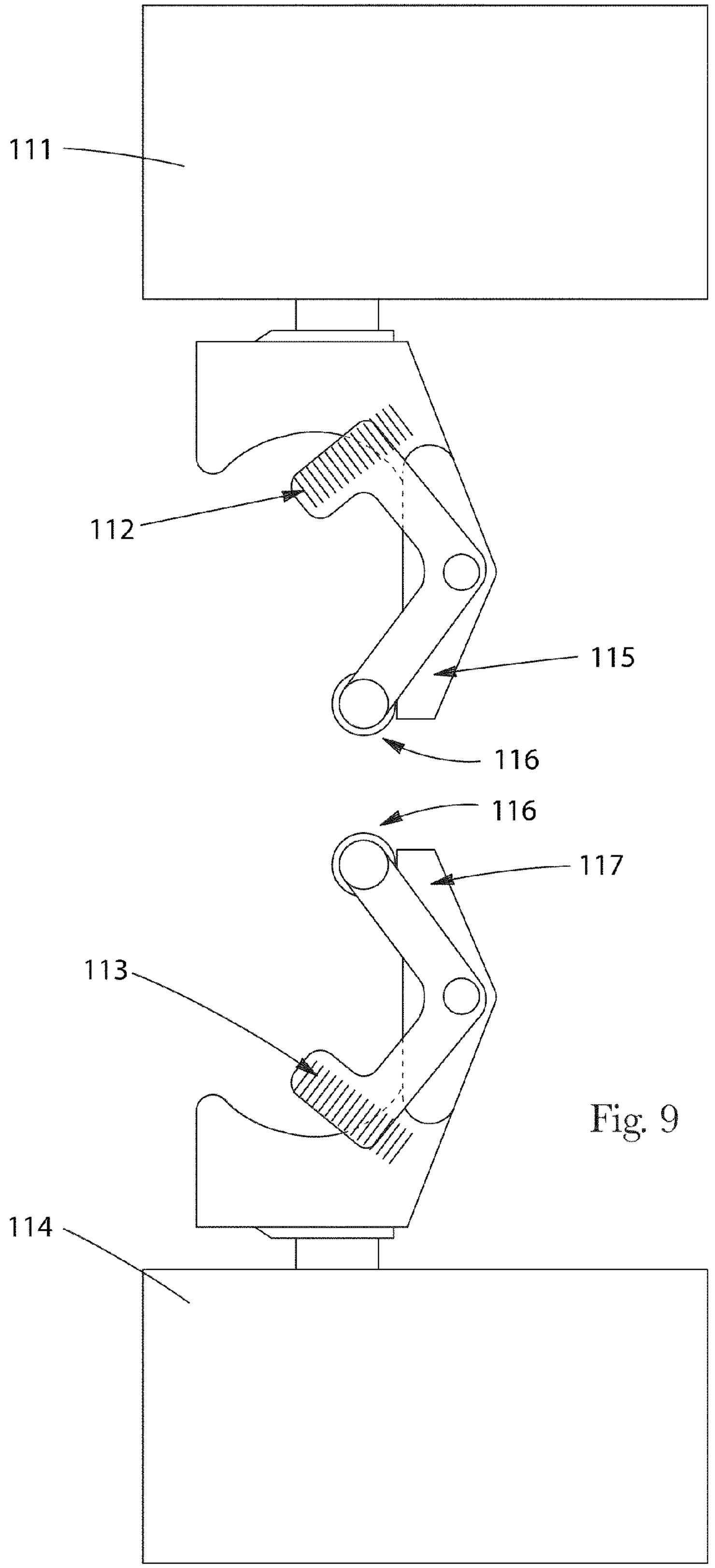
FIG. 9 is a side view of a Texture Analyzer having modified Instron Elastomeric Grips affixed thereto.

1. Stable Micro Systems Texture Analyzer TA-XT2 or TA-XT2i with 25 kg load cell capacity with Texture Expert Exceed Software and a 5 kg calibration weight.
2. Instron Elastomeric Grips (Catalog #2713-001), having the following replacement parts:
   a.) Internal springs (Instron Part No. 66-1-50) replaced with springs made from 0.5842 mm diameter wire. The replacement springs must be 3.81 cm long, have an inside diameter of 0.635 cm, and a K factor of 0.228 N/mm. Said replacement Springs can be obtained from the Jones Spring Company of Wilder, Ky. U.S.A.; and
   b.) Instron Part No. T2-322 is replaced, as shown in FIGS. 8 and 9, by a modified roller plain. Said modified roller plain is an Instron Stock Part No. T2-322 that has been machined to have a flat side 4.412 cm long and 0.9525 cm wide on said roller plain's outer surface. Said flat side is covered with Armstrong Self-adhereing Tape # Tap18230 and is positioned parallel to the sample side of the Grip's Clamp Frame Lower (Instron Part No. A2-1030)

As shown in FIGS. 8 and 9, said Instron Elastomeric Grips are fixed on the top and bottom of the Texture Analyzer.

Sample Preparation

1. Collect a dough sheet having a uniform thickness, said thickness ranging from 0.38 mm to 2.50 mm, and a length of at least 20 cm.
2. Cut samples from the dough sheet to form dough strips that are 2.5 cm wide and 15 cm long. Said strips' 15 cm length should correspond to the dough's machine direction. Cut all of the strips sequentially.
3. Protect the samples from moisture loss by placing the samples in an air-tight container. The samples must be analyzed within 10 minutes of collection to ensure that the samples are analyzed fresh.
4.

Procedures

TA Settings:
Test Mode Measure Force in Tension
Option: Return to Start
Pre-test speed: 3.0 mm/s
Test speed: 10 mm/s
Post test speed: 10 mm/s
Distance: 45 mm
Trigger Type Auto
Trigger Force: 5 g
Units: grams
Distance: millimeters
Break Detect: Off Data Analysis The sheet tensile strength for a sample is the maximum force before a sample breaks. A dough's sheet tensile strength is the average of five sample sheet tensile strengths.

8. Rheological Properties Using the Rapid Visco Analyzer (RVA)

The rheological properties of the dry ingredients are measured using the Rapid Visco Analyzer (RVA) model RVA-4 supplied by Newport Scientific Pty. Ltd. of Warriewood NSW 2102 Australia. The instrument, including moisture content corrections, should be operated in accordance with the manufacturer's instructions (using Standard Profile 1).

The parameters used to characterize components of the present invention are peak viscosity and final viscosity. The average of 3 sample peak viscosity values is considered to be the respective peak viscosity of a material, while the average of 3 sample final viscosity values is considered to be the final viscosity for a material.

RVA Method for Dry Ingredients:

1. Determine the % moisture (M) of a sample as follows:
   a.) Weight the sample to the nearest 0.01 gram.
   b.) Dry the sample in a convection oven at 130° C. for 3 hours.
   c.) Immediately after removing the sample from the oven, weight the sample to the nearest 0.01 gram.
   d.) Divide the dry weight of the sample by the initial weight of the sample and multiply the result by 100. This is the % moisture for the sample.
2. Calculate sample weight (S) and water weight (W) of the sample using Table 1 titled Weight of Sample and Added Water Corrected for Moisture Content found on page 20 of the *RVA—4 Series Instruction Manuel*, Issued March 1998.
3. Place the sample into a canister containing an equivalent weight of distilled and deionized water as that of the water weight obtained in Step (2) above and stir the combined sample and distilled and deionized water mixture using the RVA paddle by rotating said paddle 10 times in said mixture.
4. Place the canister into RVA tower and run the Standard Profile (1) which results in a graph of paste viscosity versus time.
5. From the graph of paste viscosity versus time read the maximum viscosity obtained during the heating and holding cycles of the Standard Profile (1). The maximum viscosity is the sample peak viscosity.
6. From the graph of paste viscosity versus time read the viscosity obtained at the end of the test. Said viscosity is the final viscosity.

9. Specific Density Protocol

Equipment

1. Graduated cylinder having an open end that is sufficiently large to accommodate unbroken snack pieces.
2. Balance
3. Dimethicone (200® Fluid, 350 CST. A Polydimethylsiloxane supplied by Dow Corning Corporation of Midland, Mich. U.S.A.)
4.

Procedure

1. Tare the graduated cylinder
2. Fill the graduated cylinder to the upper most graduation mark with dimethicone. Insure that the filled graduated cylinder does not contain air bubbles.
3. Weigh the dimethicone filled graduated cylinder and record the mass of the dimethicone filled graduated cylinder to the nearest one hundredth of a gram. This is the mass of dimethicone in the graduated cylinder=$m_{Dimethicone}$
4. Empty the dimethicone from graduated cylinder and clean the emptied graduated cylinder.
5. Tare the clean graduated cylinder from Step 4 above.
6. Place approximately 20 grams of unbroken test product in the graduated cylinder.

7. Weigh the graduated cylinder containing the test product and record the mass of the graduated cylinder containing the test product to the nearest one hundredth of a gram. This is the mass of the test product in the graduated cylinder=$m_{test\ product}$
8. Fill the graduated cylinder containing the test product to the upper most graduation mark with dimethicone. Insure that the filled graduated cylinder does not contain air bubbles.
9. Within 5 minutes of performing Step 8 above, weigh the graduated cylinder containing the test product and dimethicone and record the mass of the graduated cylinder containing the test product and dimethicone to the nearest one hundredth of a gram. This is the mass of the test product and dimethicone in the graduated cylinder=$m_{test\ product+dimethicone}$
10. Empty and clean the graduated cylinder from Step 9
11. Repeat Steps 1 through 10 above, using fresh dimethicone and test product, two additional times to obtain a total of three measurements per sample.
12. Average the three sample measurements to yield:
    average $m_1$ dimethicone
    average m test product
    average m test product+dimethicone Calculations ρ dimethicone=0.97 gm/mL (Density of dimethicone, literature value)

averageV$_1$dimethicone=(average $m_1$ dimethicone)/(ρ dimethicone)=volume of the cylinder average $m_2$ dimethicone=average m test product+dimethicone−average m test product averageV$_2$ dimethicone=(average $m_2$ dimethicone)/(ρ dimethicone)

average V test product=averageV$_1$ dimethicone−averageV$_2$ dimethicone

SV test product=(average Vtest product)/(average m test product)

ρ test product=1/SV test product

EXAMPLES

The following examples are illustrative of the present invention but are not meant to be limiting thereof.

Example 1

Dough Composition

| Ingredient | Supplier | City/State | gms |
|---|---|---|---|
| Potato flakes* | Oregon Potato Co. | Boardman, Oregon | 89.8 |
| Potato flanules | Basic American Foods Inc. | Blackfoot, Idaho | 5.9 |
| Instant Clearjel ® | National Starch & Chemical Co. | Bridgewater, New Jersey | 2.0 |
| Penbind ® 196 | Penford Food Ingredients Co. | Englewood, Colorado | 1.0 |
| Emulsifier** | Loders Croklaan Co. | Channahon, Illinois | 1.3 |
| Total | | | 100.0 |
| Water | N/A | N/A | 62.6 |

*Potato flakes having less than 40% broken cells, a free amylose level of less than 16% or a combination thereof.
**Emulsifier having an iodine value of 50-60 as measured using AOCS method Cd 1c-85; a monoglyceride range of from 31% to 39% as measured using IUPAC method 2.236; and a triglyceride range of 13% to 15% as measured using AOCS method Cd 1c-93. Such an emulsifier may be obtained from Loders Croklaan Co. of Channahon, Illinois U.S.A.

Dough and Fabricated Potato Crisp Making Procedure

1. Potato flakes having less than 40% broken cells are ground in a Fitz® Mill D Communitor using a Fitz® Mill 1533 0500 screen to form a potato flake having a particle size less than or equal to 1.27 cm.
2. The ground potato flakes, potato flanules, Instant Clear-jel® and Penbind® 196 are individually weighed, combined in a ribbon blender and mixed for approximately 5 minutes.
3. The ingredient mix of Step 2 above is vacuumed into a gravimetric feeder (Acrison® model #A405-200-100-170-0-D) that meters the mix at a rate of about 26 kg/hr into a Turbulizer® dough mixer where it is combined with a heated water stream having a flow rate of about 275 grams/min and a temperature of at about 70° C.; a heated emulsifier stream having a flow rate of about 5 grams/min and a temperature of at about 60° C.; and a recycled dough web is supplied in a 1:1 ratio to the combined weight of ingredient mix, water and emulsifier.
4. The dough exiting the Turbulizer® dough mixer is roll milled to a sheet thickness of about 0.021 inches (0.53 mm) before being cut into oval shaped "dovals."
5. The "dovals" are then constrained fried in mid oleic sunflower oil supplied by Cargill Foods of Minneapolis, Minn. U.S.A. at about 190° C. for the time necessary to achieve the desired finished product characteristics.
6.

Dough and Finished Chip Characteristics

The dough is tested according to Applicants' analytical methods and is found to have a sheet tensile strength of 394 gf; a modulus of elasticity of 45 KPa; a viscous modulus of 11 KPa and a Tg of −0.4° C. The finished fabricated chip is tested according to Applicants' analytical methods and is found to have a $Tg_1$ of 57° C., a $Tg_2$ of 87° C. and a density of 0.69 g/ml.

Example 2

Dough Composition

| Ingredient | Supplier | City/State | gms |
|---|---|---|---|
| Potato flakes* | Winnemucca Farms | Winnemucca, Nevada | 75.2 |
| Potato granules | Basic American Foods Inc. | Blackfoot, Idaho | 19.8 |
| N-Creamer ® 46 | National Starch & Chemical Co. | Bridgewater, New Jersey | 0.6 |
| X-pand'R ™ | A. E. Staley Manufacturing Co. | Decatur, Illinois | 2.3 |
| Sucrose | Sweetener Supply Corporation | Naperville, Illinois | 1.0 |
| Emulsifier** | Loders Croklaan Co. | Channahon, Illinois | 1.1 |
| Total | | | 100.0 |
| Water | N/A | N/A | 55.0 |

*Potato flakes having greater than 60% broken cells
**Emulsifier Formulation same as for Example 1

Dough and Fabricated Potato Crisp Making Procedure

1. The potato flakes, potato granules, N-Creamer® 46, X-pand'R, and sucrose are individually weighed, combined in a ribbon blender and mixed for approximately 20 minutes.

2. The ingredient mix of Step 1 above is vacuumed into a gravimetric feeder (Acrison® model #A405-200-100-170-0-D) that meters the mix at a rate of about 28 kg/hr into a Turbulizer® dough mixer where it is combined with a heated water stream having a flow rate of about 260 grams/min and a temperature of at about 70° C.; a heated emulsifier stream having a flow rate of about 8.2 grams/min and a temperature of at about 60° C.; and a recycled dough web is supplied in a 1:1 ratio to the combined weight of ingredient mix, water and emulsifier.
3. The dough exiting the Turbulizer® dough mixer is roll milled to a sheet thickness of about 0.021 inches (0.53 mm) before being cut into oval shaped "dovals."
4. The "dovals" are then constrained fried in mid oleic sunflower oil supplied by Cargill Foods of Minneapolis, Minn. U.S.A. at about 190° C. for the time necessary to achieve the desired finished product characteristics.
5.

Dough and Finished Chip Characteristics

The dough is tested according to Applicants' analytical methods and is found to have a sheet tensile strength of 276 gf; a modulus of elasticity of 38 KPa; a viscous modulus of 11.5 KPa and a Tg of 1.4° C. The finished fabricated chip is tested according to Applicants' analytical methods and is found to have a $Tg_1$ of 56° C., a $Tg_2$ of 95° C. and a density of 0.83 g/ml.

Example 3

Dough Composition

| Ingredient | Supplier | City/State | gms |
|---|---|---|---|
| Potato flakes* | Magic West, Inc. | Glenns Ferry, Idaho | 80.6 |
| Instant Clearjel ® | National Starch & Chemical Co. | Bridgewater, New Jersey | 2.9 |
| Potato granules | Basic American Foods | Blackfoot, Idaho | 14.7 |
| Emulsifier** | Loders Croklaan Co. | Channahon, Illinois | 1.8 |
| Total | | | 100.0 |
| Water | N/A | N/A | 60.0 |

*Potato flakes having less than 40% broken cells and a free amylose level of more than 27%.
**Emulsifier Formulation same as for Example 1

Dough and Fabricated Potato Crisp Making Procedure:

1. The potato flakes, Instant Clearjel® and potato granules are individually weighed, combined in a ribbon blender and mixed for approximately 20 minutes.
2. The ingredient mix of Step 1 above is vacuumed into a gravimetric feeder (Acrison® model #A405-200-100-170-0-D) that meters the mix at a rate of about 27 kg/hr into a Turbulizer® dough mixer where it is combined with a heated water stream having a flow rate of about 275 grams/min and a temperature of at about 70° C.; a heated emulsifier stream having a flow rate of about 8 grams/min and a temperature of at about 60° C.; and a recycled dough web is supplied in a 1:1 ratio to the combined weight of ingredient mix, water and emulsifier.
3. The dough exiting the Turbulizer® dough mixer is roll milled to a sheet thickness of about 0.021 inches (0.53 mm) before being cut into oval shaped "dovals."

4. The "dovals" are then constrained fried in mid oleic sunflower oil supplied by Cargill Foods of Minneapolis, Minn. U.S.A. at about 190° C. for the time necessary to achieve the desired finished product characteristics.

Dough and Finished Chip Characteristics

The dough is tested according to Applicants' analytical methods and is found to have a sheet tensile strength of 172 gf; a modulus of elasticity of 33 KPa; a viscous modulus of 11 KPa and a Tg of 1.7° C. The finished fabricated chip is tested according to Applicants' analytical methods and is found to have a $Tg_1$ of 53° C., a $Tg_2$ of 92° C. and a density of 0.74 g/ml.

Example 4

Dough Composition

| Ingredient | Supplier | City/State | gms |
|---|---|---|---|
| Potato flakes* | Magic West, Inc. | Glenns Ferry, Idaho | 77.2 |
| Baka-Snak ® | National Starch & Chemical Co. | Bridgewater, New Jersey | 3.0 |
| Aytex ®-P food powder wheat starch | Archer Daniels Midland Co. | Olathe, Kansas | 7.9 |
| Pregel Yellow Corn Meal | Illinois Cereal Mills Inc. | Paris, Illinois | 4.0 |
| Paselli ™ EZ 1912 | Avebe America Inc. | Princeton, New Jersey | 5.9 |
| Sucrose | Sweetener Supply Corporation | Naperville, Illinois | 1.0 |
| Emulsifier** | Loders Croklaan Co. | Channahon, Illinois | 1.0 |
| Total | | | 100.0 |
| Water | N/A | N/A | 56.0 |

*Potato flakes having less than 40% broken cells and a free amylose level of more than 27%
.
**Emulsifier Formulation same as for Example 1

Dough and Fabricated Potato Crisp Making Procedure:

1. The potato flakes, Baka-Snak®, wheat starch, corn meal, Paselli™ EZ 1912, and sucrose are individually weighed, combined in a ribbon blender and mixed for approximately 20 minutes.
2. The ingredient mix of Step 1 above is vacuumed into a gravimetric feeder (K-tron Soder model # K2MLT35) that meters the mix at a rate of about 18 kg/hr.
3. A heated water stream having a flow rate of about 170 grams/minute and a temperature of about 70° C. is combined with a heated emulsifier stream having a flow rate of about 3 grams/minute and a temperature of about 60° C. to form a water and emulsifier mix.
4. The ingredient mix of Step 2 above is combined with the mix of Step 3 above in a Pavan model G70 pre-mixer to form a loose dough.
5. The loose dough exiting the pre-mixer is supplied to a Pavan G70 mixer wherein said loose dough is combined with a recycled dough web in a 1:1 ratio to the weight of said loose dough.
6. The dough exiting the Pavan G70 mixer is roll milled to a sheet thickness of about 0.027 inches (0.69 mm) before being cut into oval shaped "dovals."
7. The "dovals" are then fried in mid oleic sunflower oil supplied by Cargill Foods of Minneapolis, Minn. U.S.A. at about 190° C. for the time necessary to achieve the desired finished product characteristics.

Dough and Finished Chip Characteristics

The dough is tested according to Applicants' analytical methods and is found to have a sheet tensile strength of 161 gf; a modulus of elasticity of 75 KPa; a viscous modulus of 25 KPa and a Tg of 6.5° C. The finished fabricated chip is tested according to Applicants' analytical methods and is found to have a $Tg_1$ of 50° C., a $Tg_2$ of 86° C. and a density of 0.79 g/ml.

What is claimed:

1. A fabricated chip made with a dough wherein said dough comprises:

a. from about 55% to about 98%, by weight of the dough, of a dehydrated potato product having less than 40% broken cells, a free amylose level of less than 16% or a mixture thereof;

b. from about 1% to about 15%, by weight of the dough, of a strengthening agent having a free amylose level of at least 5% and a water absorption index of from about 0 to about 3 wherein the strengthening agent is a starch selected from the group consisting of tapioca, potato, wheat and mixtures thereof;

c. from about 1% to about 10%, by weight of the dough, of a water absorption agent having a water absorption index of greater than 12 wherein the water absorption agent is a pre-gelatinized corn starch; and d. a solvent.

2. The fabricated chip of claim 1, having a $Tg_1$ greater than about 40° C. and a $Tg_2$ of greater than about 70° C.

3. The fabricated chip of claim 1, having a $Tg_1$ of from about 45° C. to about 75° C. and a $Tg_2$ of from about 80° C. to about 120° C.

4. The fabricated chip of claim 1, having a $Tg_1$ of from about 50° C. to about 75° C. and a $Tg_2$ of from about 80° C. to about 105° C.

5. The fabricated chip of claim 1 wherein said fabricated chip has a density of from about 0.55 g/ml to about 1.1 g/ml.

6. The fabricated chip of claim 1 wherein said fabricated chip has a density of from about 0.65 g/ml to about 0.95 g/ml.

7. The fabricated chip of claim 1 wherein said fabricated chip has a density of from about 0.75 g/ml to about 0.85 g/ml.

8. The fabricated chip of claim 1, wherein said fabricated chip is fried.

9. The fabricated chip of claim 1, wherein said fabricated chip has a final moisture level of from about 0.5% to about 4%.

10. The fabricated chip of claim 1, wherein said fabricated chip has a final moisture level of from about 1% to about 2%.

11. The fabricated chip of claim 1, wherein said fabricated chip has from about 20% to about 45% total fat.

12. The fabricated chip of claim 1, wherein said fabricated chip has from about 25% to about 40% total fat.

13. The fabricated chip of claim 1, further comprising triglyceride oil wherein said triglyceride oil has an iodine value greater than about 75.

14. The fabricated chip of claim 1, further comprising a flavor wherein said flavor is selected from the group consisting of butter flavored oils, natural flavored oils, artificial flavored oils, herb oils, potato flavored oils, garlic flavored oils, or onion flavored oils, and combinations thereof.

15. The fabricated chip of claim 1, wherein said dough has a Tg of from about −10° C. to about 10° C.

16. The fabricated chip of claim 1, wherein said dough has a sheet tensile strength of from about 60 gf to about 600 gf.

17. The fabricated chip of claim 16, wherein said dough a Tg of from about −10° C. to about 10° C.

18. The fabricated chip of claim 1, where said dough further comprises from about 1% to about 15%, by weight of the dough, of a wetting agent having a peak viscosity of from about 300 cp to about 2000 cp, and a final viscosity of from about 190 cp to about 1900 cp.

19. The fabricated chip of claim 18, wherein said fabricated chip has a density of from about 0.55 g/ml to about 1.1 g/ml.

20. The fabricated chip of claim 1, wherein said dough has a thickness of from about 0.38 mm to about 2.50 mm.

* * * * *